US011220115B2

(12) United States Patent
Edamura

(10) Patent No.: US 11,220,115 B2
(45) Date of Patent: Jan. 11, 2022

(54) PRINTING APPARATUS AND CONTROL METHOD THEREFOR

(71) Applicant: CANON KABUSHIKI KAISHA, Tokyo (JP)

(72) Inventor: Tetsuya Edamura, Inagi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/016,786

(22) Filed: Sep. 10, 2020

(65) Prior Publication Data
US 2021/0070067 A1 Mar. 11, 2021

(30) Foreign Application Priority Data

Sep. 10, 2019 (JP) .............................. JP2019-164787

(51) Int. Cl.
B41J 11/00 (2006.01)
B41J 13/00 (2006.01)
G06K 15/10 (2006.01)
G06K 15/16 (2006.01)
G06K 15/02 (2006.01)
G06K 15/00 (2006.01)

(52) U.S. Cl.
CPC ......... *B41J 11/002* (2013.01); *B41J 13/0009* (2013.01); *G06K 15/102* (2013.01); *G06K 15/16* (2013.01); *G06K 15/186* (2013.01); *G06K 15/4055* (2013.01)

(58) Field of Classification Search
CPC .. G06K 15/4055; G06K 15/16; G06K 15/102; G06K 15/186; B41J 13/0009; B41J 11/002
USPC ........................................ 347/101, 102, 104
See application file for complete search history.

(56) References Cited

U.S. PATENT DOCUMENTS

| 9,855,740 | B2* | 1/2018 | Nakano | B41J 29/02 |
| 10,201,984 | B2 | 2/2019 | Monclus Velasco et al. | |
| 10,300,712 | B2* | 5/2019 | Sakamoto | B41J 11/00216 |
| 10,300,718 | B2* | 5/2019 | Yamamoto | B41J 11/00244 |
| 2002/0027587 | A1 | 3/2002 | Sugaya et al. | |
| 2018/0009237 | A1 | 1/2018 | Sakamoto et al. | |

FOREIGN PATENT DOCUMENTS

| JP | 2001-058398 A | 3/2001 |
| JP | 2009-154368 A | 7/2009 |

OTHER PUBLICATIONS

Extended European Search Report dated Feb. 8, 2021, in European Patent Application No. 20193660.6.

* cited by examiner

Primary Examiner — An H Do
(74) Attorney, Agent, or Firm — Venable LLP

(57) ABSTRACT

A printing apparatus includes a conveyance unit for conveying a print medium fed from a feeding apparatus, a detection unit for detecting the fed print medium, a printhead, provided downstream of the detection unit with respect to a conveyance direction of the print medium, for printing an image by discharging ink to the conveyed print medium, and a heating unit, provided downstream of the printhead with respect to the conveyance direction, for heating the print medium on which the image is printed. The printing apparatus exclusively controls to stop driving of the heating unit if it is determined, based on a timing of detecting the print medium, that the print medium is at a print position, and to drive the heating unit if it is determined that the print medium is not at the print position.

19 Claims, 16 Drawing Sheets

F I G. 8
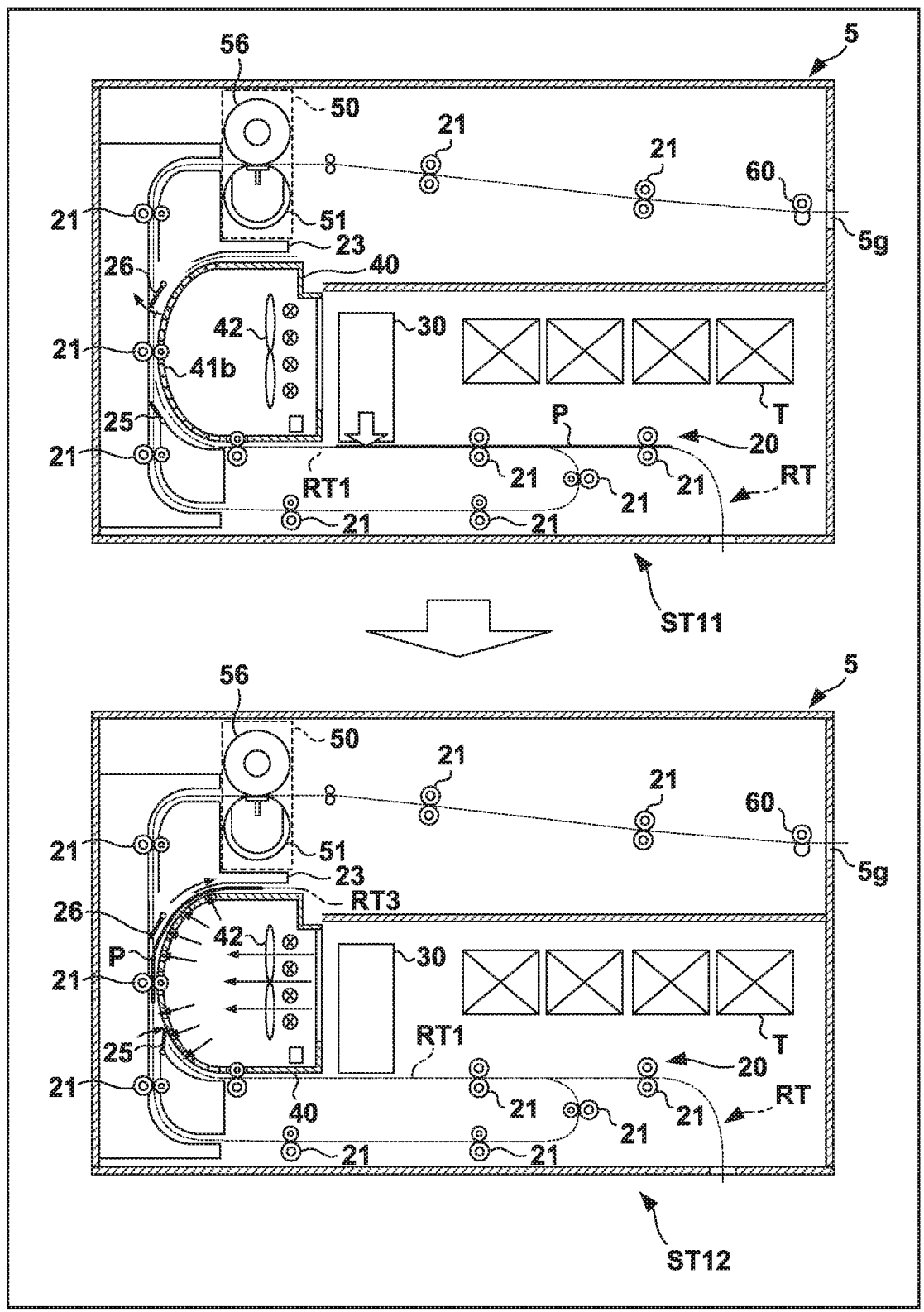

PRINTING APPARATUS AND CONTROL METHOD THEREFOR

BACKGROUND OF THE INVENTION

Field of the Invention

The present invention relates to a printing apparatus and a control method therefor, and particularly to, for example, a power suppression technique for a printing apparatus mounted with an inkjet printhead.

Description of the Related Art

Some of conventional inkjet printing apparatuses include a mechanism of drying ink discharged from a printhead to a print medium (for example, print paper). For example, Japanese Patent Laid-Open No. 2009-154368 discloses a printing apparatus that includes a halogen lamp to heat a roller for holding a conveyance belt which conveys a print medium, and dries, by heating, ink discharged to the print medium by the heated roller. The printing apparatus disclosed in Japanese Patent Laid-Open No. 2009-154368 includes a plurality of line heads arranged along the conveyance direction of the conveyance belt, and also includes a plurality of rollers between the line heads. The printing apparatus controls to suppress the power consumption amount by heating only necessary ones of the plurality of rollers.

However, in the above-described conventional example, printing is executed using the plurality of line heads and the plurality of heated rollers. Thus, even if only necessary ones of the plurality of rollers are selectively heated, instantaneous maximum power consumption is still high. For example, a power of about 200 W is consumed to drive one line head, and a power of about 300 W is consumed to drive a thermal fixing unit for heating a roller. Therefore, if these units are concurrently driven, a power of 500 W is consumed.

SUMMARY OF THE INVENTION

Accordingly, the present invention is conceived as a response to the above-described disadvantages of the conventional art.

For example, a printing apparatus and a control method therefor according to this this invention are capable of suppressing the instantaneous maximum power consumption.

According to one aspect of the present invention, there is provided a printing apparatus comprising: a conveyance unit configured to convey a print medium fed from a feeding apparatus; a detection unit configured to detect the print medium fed from the feeding apparatus; a printhead provided on a downstream of the detection unit with respect to a conveyance direction of the print medium by the conveyance unit and configured to print an image by discharging ink to the print medium conveyed by the conveyance unit; a heating unit provided on a downstream of the printhead with respect to the conveyance direction and configured to heat the print medium on which the image is printed by the printhead; and a control unit configured to exclusively control to stop driving of the heating unit if it is determined, based on a timing of detecting the print medium by the detection unit, that the print medium is at a print position where the print medium is printed by the printhead, and to drive the heating unit if it is determined that the print medium is not at the print position.

According to another aspect of the present invention, there is provided a control method for a printing apparatus including a conveyance unit configured to convey a print medium fed from a feeding apparatus, a detection unit configured to detect the print medium fed from the feeding apparatus, a printhead provided on a downstream of the detection unit with respect to a conveyance direction of the print medium by the conveyance unit and configured to print an image by discharging ink to the print medium conveyed by the conveyance unit, and a heating unit provided on a downstream of the printhead with respect to the conveyance direction and configured to heat the print medium on which the image is printed by the printhead, the method comprising: exclusively controlling to stop driving of the heating unit if it is determined, based on a timing of detecting the print medium by the detection unit, that the print medium is at a print position where the print medium is printed by the printhead, and to drive the heating unit if it is determined that the print medium is not at the print position.

The invention is particularly advantageous since driving of a printhead and driving of a heating unit are exclusively controlled and it is thus possible to suppress the instantaneous maximum power consumption.

Further features of the present invention will become apparent from the following description of exemplary embodiments (with reference to the attached drawings).

BRIEF DESCRIPTION OF THE DRAWINGS

FIG. 8 is an explanatory view of the operation of the printing apparatus shown in FIG. 2;

DESCRIPTION OF THE EMBODIMENTS

Figure 1:
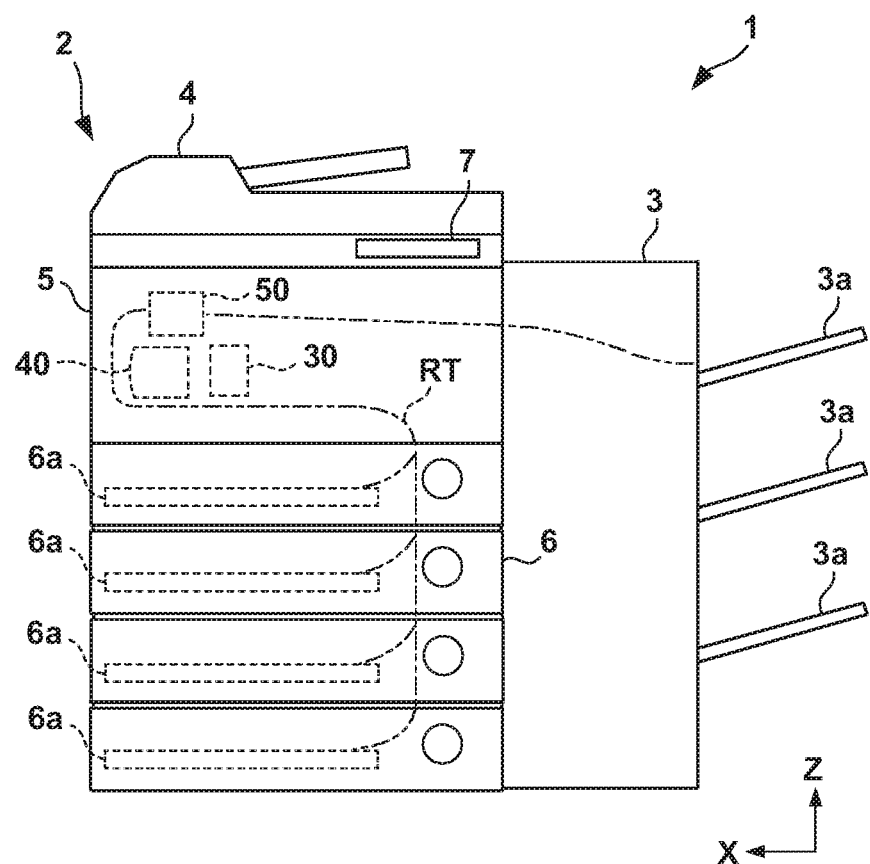
FIG. 1 is a front view of a printing system.

Exemplary embodiments of the present invention will now be described in detail in accordance with the accompanying drawings. It should be noted that the following embodiments are not intended to limit the scope of the appended claims. A plurality of features are described in the embodiments. Not all the plurality of features are necessarily essential to the present invention, and the plurality of features may arbitrarily be combined. In addition, the same reference numerals denote the same or similar parts throughout the accompanying drawings, and a repetitive description will be omitted.

In this specification, the terms "print" and "printing" not only include the formation of significant information such as characters and graphics, but also broadly include the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be broadly interpreted to be similar to the definition of "print" described above. That is, "ink" includes a liquid which, when applied onto a print medium, can form images, figures, patterns, and the like, can process the print medium, and can process ink. The process of ink includes, for example, solidifying or insolubilizing a coloring agent contained in ink applied to the print medium.

Further, the term "nozzle" means an ink orifice or a liquid channel communicating with it, unless otherwise specified. A "print element" is provided in correspondence to an orifice, and used to mean an element for generating energy used to discharge ink. For example, the print element may be provided in a position opposite to the orifice.

An element substrate for a printhead (head substrate) used below means not merely a base made of a silicon semiconductor, but an arrangement in which elements, wirings, and the like are arranged.

Further, "on the substrate" means not merely "on an element substrate", but even "on the surface of the element substrate" and "inside the element substrate near the surface". In the present invention, "built-in" means not merely arranging respective elements as separate members on the base surface, but integrally forming and manufacturing respective elements on an element substrate by a semiconductor circuit manufacturing process or the like.

Arrangement of Printing System

FIG. 1 is a front view of a printing system 1 according to an embodiment of the present invention. In the drawings including FIG. 1, arrows X and Y indicate a horizontal direction and a depth direction, respectively, which are perpendicular to each other. An arrow Z indicates a vertical direction.

The printing system 1 includes a main body apparatus 2 and a post processing apparatus 3. The main body apparatus 2 according to this embodiment is an apparatus forming a multi-function peripheral, and has a copy function, a scanner function, and a printer function. The main body apparatus 2 includes a reading apparatus 4, a printing apparatus 5, and a feeding apparatus 6, and an operation unit 7 is provided in the front portion of the main body apparatus 2. The operation unit 7 serves as an input/output interface with a user, and includes, for example, hard keys and a display unit or a touch panel that accepts input from the user and displays information, and also includes an output unit such as a voice generator.

The reading apparatus 4 includes an ADF (Automatic Document Feeder), and conveys stacked documents and reads document images. The feeding apparatus 6 is an apparatus that feeds a print medium to the printing apparatus 5. In this embodiment, the print medium is a sheet such as paper or a film, and is particularly a cut sheet. The print medium may be referred to as a sheet hereinafter. The feeding apparatus 6 includes a plurality of cassettes 6a on which sheets are stacked, and a feeding mechanism (not shown) that feeds a sheet from the cassette 6a to the printing apparatus 5 on a conveyance path RT.

The printing apparatus 5 prints an image on the sheet. The printing apparatus 5 includes a printing unit 30 that prints an image by discharging ink to a sheet, and a first drying acceleration unit 40 and a second drying acceleration unit 50 that accelerate drying of the sheet. Details of the printing apparatus 5 will be described later.

The post processing apparatus 3 serves as a finisher (sheet processing apparatus) that is separably attached to a side portion of the main body apparatus 2 as an optional apparatus and performs post processing of the sheet. The post processing includes, for example, a stacking processing of stacking, on a tray 3a, a sheet discharged from the printing apparatus 5, and a sort processing of taking in a plurality of sheets discharged from the printing apparatus 5 and aligning and bundling them. The post processing can further include stapling processing of binding bundled sheets by staplers, binding processing, and punching processing.

Arrangement of Printing Apparatus

Figure 2:
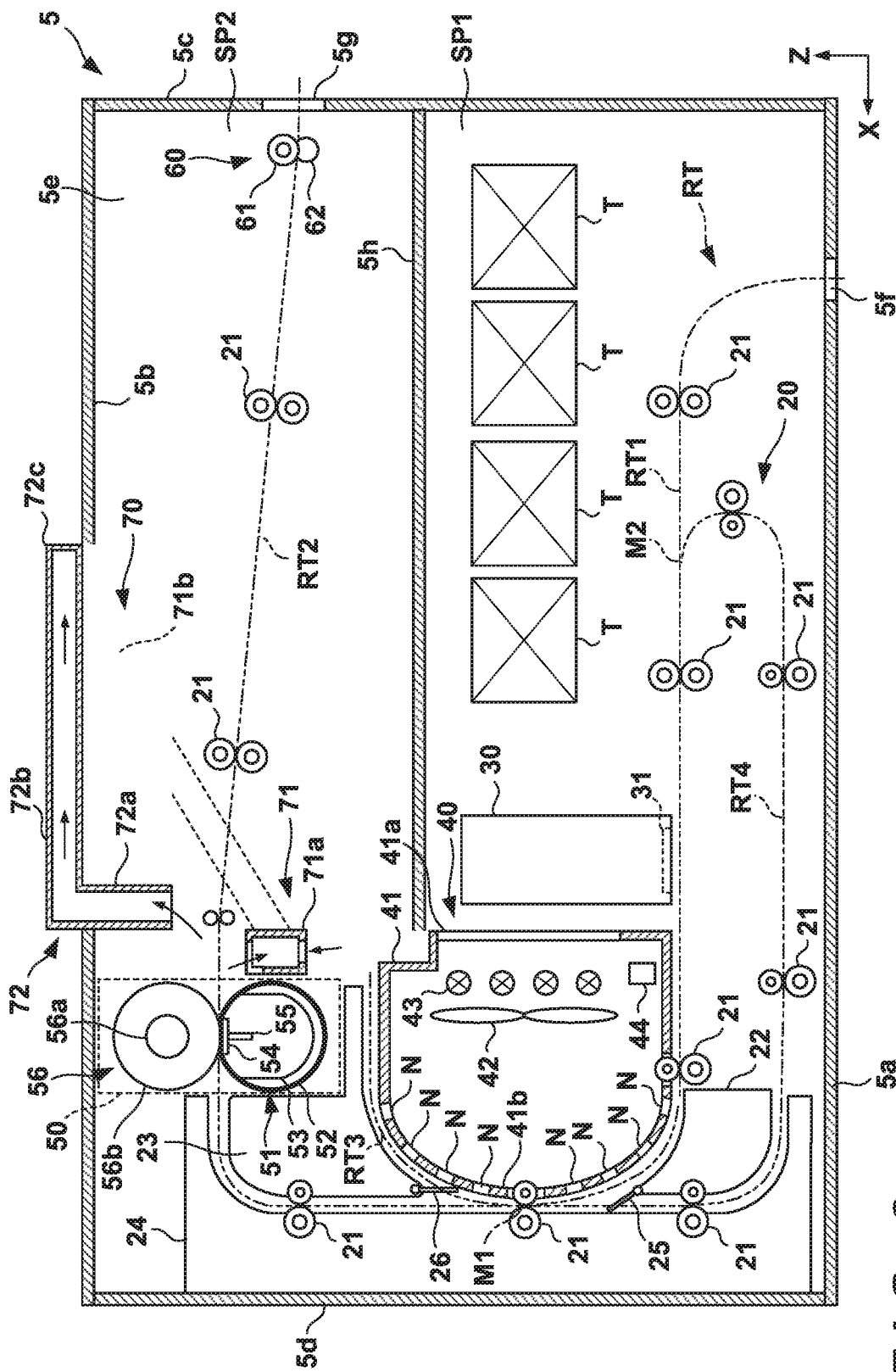
FIG. 2 is a schematic view of a printing apparatus.

FIG. 2 is an explanatory view showing the internal arrangement of the printing apparatus 5. The printing apparatus 5 includes, as a frame for supporting the internal mechanism, a bottom wall portion 5a, an upper wall portion 5b, a right wall portion 5c, a left wall portion 5d, and a back wall portion 5e. These wall portions define the internal space of the printing apparatus 5. The internal space of the printing apparatus 5 is divided into a lower space SP1 and an upper space SP2 by a partition wall 5h. The spaces SP1 and SP2 are not hermetically divided, and communicate with each other.

The bottom wall portion 5a includes an opening 5f through which a sheet fed from the feeding apparatus 6 passes. The right wall portion 5c includes an opening 5g through which a sheet passes to be discharged to the post processing apparatus 3. The left wall portion 5d and the right wall portion 5c may be supported to be opened/closed in a door type for maintenance.

The printing apparatus 5 includes a conveyance unit 20, the printing unit 30, the first drying acceleration unit 40, the second drying acceleration unit 50, a correction unit 60, and an exhaust unit 70.

Conveyance Unit

The conveyance unit 20 is a mechanism that conveys a sheet along the conveyance path RT. In this embodiment, the conveyance path RT is a path which has the opening 5*f* as an upstream end and the opening 5*g* as a downstream end and on which the sheet is conveyed. The conveyance path RT includes main paths RT1 and RT2, a switch-back path RT3, and an inverting path RT4. The main paths RT1 and RT2 are paths from the opening 5*f* to the opening 5*g* via an intermediate point M1. The main path RT1 is a path from the opening 5*f* to the intermediate point M1, and the main path RT2 is a path from the intermediate point M1 to the opening 5*g*. The main paths RT1 and RT2 are paths on which the sheet is conveyed leftward→upward→rightward, and the sheet passes through the printing unit 30→first drying acceleration unit 40→second drying acceleration unit 50→correction unit 60. For one-sided print of printing on only one surface of the sheet, the sheet is conveyed through the main paths RT1 and RT2.

The switch-back path RT3 and the inverting path RT4 are paths on which the sheet is conveyed after printing on one surface for double-sided print of printing on both surfaces of the sheet. The switch-back path RT3 forms a path from the intermediate point M1, which is different from the main path RT2. The inverting path RT4 is a path from the intermediate point M1 to a midway joining point M2 on the main path RT1. The sheet is inverted via the inverting path RT4, and is returned to the main path RT1 again.

When referring to the downstream side and the upstream side in the following description, the conveyance direction of the sheet on the conveyance path RT is set as a reference.

The conveyance unit 20 includes a driving mechanism that applies a conveying force to the sheet, and a guide that guides conveyance of the sheet along the conveyance path RT, and FIG. 2 shows part of the conveyance unit 20. The driving mechanism includes a plurality of conveyance rollers 21 driven by a driving source such as a motor. For each conveyance roller 21, a driven roller or a spur is arranged to face it. The sheet is conveyed while being nipped between each conveyance roller 21 and its corresponding driven roller or spur. The spur is arranged to contact a printing surface in a region on the downstream side with respect to the printing unit 30 in order to maintain the quality of a printed image. The guide includes guide members 22 to 24. The guide member 24 is supported by the left wall portion 5*d*. Part of the conveyance path RT is formed between the guide members 23 and 24 and part of the main path RT1 is formed between the guide members 22 and 24.

Figure 3:
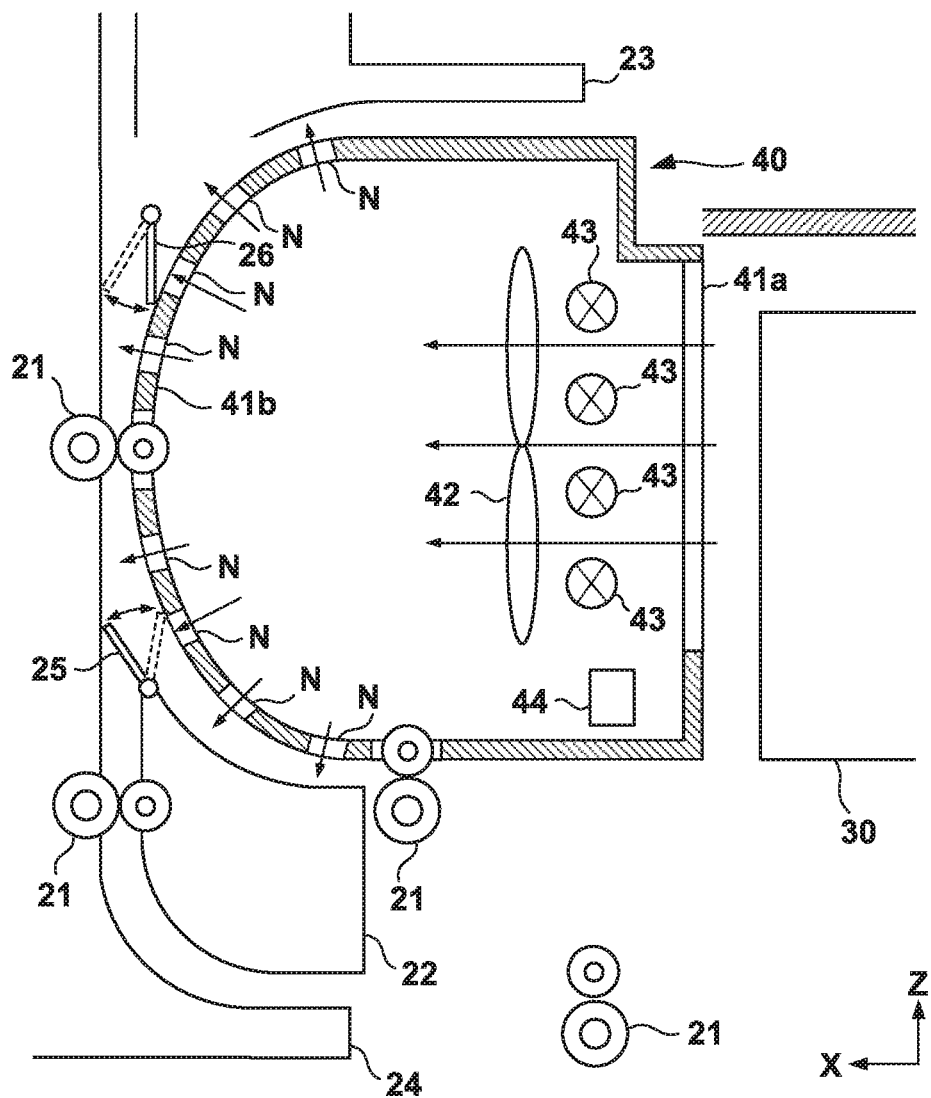
FIG. 3 is an explanatory view of a drying acceleration unit.

The conveyance unit 20 includes path switching units 25 and 26. The path switching units 25 and 26 are units that switch the guiding path of the sheet, and are operated by a driving source such as an electromagnetic solenoid or a motor. For one-sided print, the path switching units 25 and 26 guide the sheet from the main path RT1 to the main path RT2. For double-sided print, the path switching units 25 and 26 guide the sheet from the main path RT1 to the switch-back path RT3, and guide the switched-back sheet to the inverting path RT4. FIG. 3 shows the path switching mode of the path switching units 25 and 26. The path switching units 25 and 26 each include a pivotable flap, and switch the path by the positions of the flaps. The positions indicated by solid lines are those for one-sided print, and the positions indicated by broken lines are those for double-sided print.

Printing Unit

Referring back to FIG. 2, the printing unit 30 includes printheads 31, and each printhead 31 is an inkjet head that forms an image (ink image) by discharging ink to a sheet. Inks to be discharged by the printheads 31 are stored in a plurality of ink reservoirs T. The ink reservoirs T are provided for the respective kinds of inks. The kinds of inks are, for example, yellow, magenta, cyan, and black as kinds of colors.

The printheads 31 are provided for the respective kinds of inks. In this embodiment, each printhead 31 is a full-line head extended in the Y direction, and nozzles are arrayed within a range where they cover the width of an image printing area of a sheet having a usable maximum size. Each printhead includes a lower surface facing the sheet via a minute gap (for example, several mm), and the lower surface forms an ink discharge surface with the opened nozzle.

Each nozzle includes a discharge element. The discharge element is, for example, an element that generates a pressure in the nozzle and discharges ink in the nozzle, and the technique of a known inkjet head is applicable. Examples of the discharge element are an element that discharges ink by causing film boiling in ink with an electrothermal transducer and forming a bubble, an element that discharges ink by an electromechanical transducer, and an element that discharges ink by using static electricity. The discharge element that uses the electrothermal transducer can be used to perform high-speed and high-density printing.

Note that the printing unit 30 may be a serial-type printing unit in which printheads mounted on a carriage execute printing by reciprocally moving in the width direction of a sheet. The number of kinds of discharged inks may be one, for example, only black ink may be discharged. As the print mode of the printing unit 30, a print mode of using a single ink or a print mode of using a plurality of kinds of inks can be selected. Each ink may mainly contain a coloring material (dye or pigment) and a solvent component. As a solvent component, a water-based material can be used. As a dye, for example, a water-soluble dye represented by a direct dye, an acid dye, a basic dye, a reactive dye, an edible pigment, or the like is preferable. However, any dye may be used as long as an image that satisfies a fixing property, color development, sharpness, stability, light resistance, and other required properties in combination of the print medium is obtained. As a pigment, carbon black or the like is preferable. Any of a method using a pigment and a dispersant, a method using a self-dispersion type pigment, and a method of performing microencapsulation can be used. Furthermore, ink can be used by adding, as appropriate, various additives such as a solvent component, a solubilizer, a viscosity modifier, a surfactant, a surface tension regulator, a pH adjuster, and a resistivity modifier.

Drying Acceleration Unit

A sheet on which an image has been printed by the printing unit 30 may be expanded due to the liquid of the ink, and may be waved. Such sheet causes a paper jam in the printing apparatus 5 or degrades stackability/alignment in the post processing apparatus 3. By accelerating drying of the sheet, it is possible to suppress expansion of the sheet caused by the liquid of the ink. The printing apparatus 5 according to this embodiment includes the plurality of drying acceleration units, that is, the first drying acceleration unit 40 and the second drying acceleration unit 50 of different sheet drying methods.

The first drying acceleration unit 40 is a unit that is arranged on the downstream side with respect to the printing unit 30 and accelerates drying of the sheet by blowing warm air to the sheet without contacting the sheet. The structure of the first drying acceleration unit 40 will be described with reference to FIGS. 2 and 3.

The first drying acceleration unit 40 includes a hollow body 41 that defines the internal space, and a fan 42 and heating elements 43 all of which are arranged in the hollow body 41. The hollow body 41 includes an air intake port 41a in a right portion. A wall portion 41b that forms the left portion of the hollow body 41 is a guide wall portion also serving as a sheet conveyance guide, and is extended in the Y direction to cover the width of a sheet having the maximum size. The guide wall portion 41b has a C-shaped sectional shape (a section on an X-Z plane), and includes a wall surface facing the guide members 22 to 24. Part of the conveyance path RT is formed between the wall surface and the guide members 22 to 24, and the intermediate point M1 is also set. In the guide wall portion 41b, a number of warm air blowing holes N communicating with the internal space of the hollow body 41 are formed.

The fan 42 is an electric fan that uses a motor as a driving source, and is, for example, a sirocco fan. The fan 42 introduces air from the air intake port 41a into the hollow body 41. The pressure in the hollow body 41 increases by the introduced air, and the air in the hollow body 41 is blown out of the hollow body 41 from the blowing holes N. One fan 42 may be provided or a plurality of fans 42 may be juxtaposed in the Y direction.

The heating elements 43 heat the air introduced by the fan 42 from the air intake port 41a into the hollow body 41. In this embodiment, each heating element 43 is a rod-like heating element such as an infrared lamp heater, and is extended in the Y direction. The plurality of heating elements 43 are arrayed in the Z direction. The plurality of heating elements 43 are arranged between the fan 42 and the air intake port 41a, and the air introduced from the air intake port 41a into the hollow body 41 is heated when it passes through the heating elements 43. A temperature sensor 44 is provided in the first drying acceleration unit 40, and driving of the heating elements 43 is controlled in accordance with the detection result of the temperature sensor 44.

With this arrangement, the first drying acceleration unit 40 blows warm air from the blowing holes N, as indicated by an airflow represented by arrows in FIG. 3. This can heat the sheet passing through the conveyance path RT, and promote evaporation of a liquid contained in the ink image on the sheet, thereby accelerating drying of the sheet.

The second drying acceleration unit 50 is a thermal fixing unit that is arranged on the downstream side with respect to the first drying acceleration unit 40 and accelerates drying of the sheet by heating the sheet in contact with the image printing surface of the sheet. The structure of the second drying acceleration unit 50 will be described with reference to FIG. 2.

The second drying acceleration unit 50 includes a heater 51 and a roller 56, which are extended in the Y direction to cover the width of a sheet having the maximum size. The heater 51 includes a support member 53 that supports a heating element 54. The heating element 54 is, for example, a ceramic heater, and is extended in the Y direction. The temperature of the heating element 54 is detected by a temperature sensor 55 represented by a thermistor, and driving of the heating element 54 is controlled based on a detection result.

The support member 53 also supports a film 52. The film 52 is formed in a cylindrical shape and extended in the Y direction. The film 52 is supported by the support member 53 to be rotatable about the support member 53, and is interposed between the roller 56 and the heating element 54. The film 52 is, for example, a single-layer film or composite layer film having a film thickness of 10 μm (inclusive) to 100 μm (inclusive). When the film 52 is a single-layer film, for example, PTFE, PFA, or FEP is used as a material. When the film 52 is a composite film, for example, it is a film with a layer structure that covers or coats a layer of polyimide, polyamide-imide, PEEK, PES, PPS, or the like with PTFE, PFA, FEP, or the like.

Note that the arrangement of the heater 51 is not limited to this, and may have, for example, a structure that includes a heating element such as a halogen heater in a hollow metal core and covers the periphery of the core with an elastic body such as a silicone rubber.

The roller 56 is formed by covering the periphery of a core 56a with an elastic body 56b such as a silicone rubber. The roller 56 is pressed against the heater 51 by a predetermined pressing force, and the roller 56 and the heater 51 form a nip portion. The roller 56 is rotated using a motor as a driving source, and the film 52 rotates together with the roller 56. With this arrangement, the sheet is heated while being conveyed in the nip portion, thereby making it possible to accelerate drying of the sheet.

In this embodiment, the first drying acceleration unit 40 and the second drying acceleration unit 50 dry the sheet in two stages. However, only one of the drying acceleration units may be provided.

Correction Unit

The correction unit 60 is a mechanism that corrects the curvature (curl in this example) of a sheet. In this embodiment, the correction unit 60 includes a large-diameter driving roller 61 and a small-diameter driven roller 62. The driving roller 61 is a roller obtained by covering the periphery of a core with an elastic body such as a silicone rubber. The driven roller 62 is a metal roller. The driving roller 61 and the driven roller 62 are in press contact with each other. When a sheet passes between the driving roller 61 and the driven roller 62, these rollers can apply a pressure to the sheet to correct the curl of the sheet. The correction unit 60 can apply, to the sheet, a correction force in, for example, an upwardly-convex direction. In this case, the correction unit 60 can correct a sheet having a downwardly-convex curl to a flatter state.

Exhaust Unit

The exhaust unit 70 is a unit that exhausts the air in the printing apparatus 5 outside the apparatus. The printing apparatus 5 according to this embodiment includes the first drying acceleration unit 40 and the second drying acceleration unit 50, which raise the temperature in the apparatus. In addition, these units operate to evaporate moisture of ink. When continuously printing on a number of sheets, the humidity in the apparatus may rise. A high humidity causes the sheet to be curved. The conveyance distance of the sheet from the second drying acceleration unit 50 to the opening 5g is relatively long, and the sheet is conveyed within the upper space SP2 where water vapor is readily retained. In the space SP2, the sheet may be exposed to a high-humidity atmosphere. The humidity in the apparatus can be lowered when the exhaust unit 70 exhausts the air in the space SP2 outside the apparatus.

Figure 4:
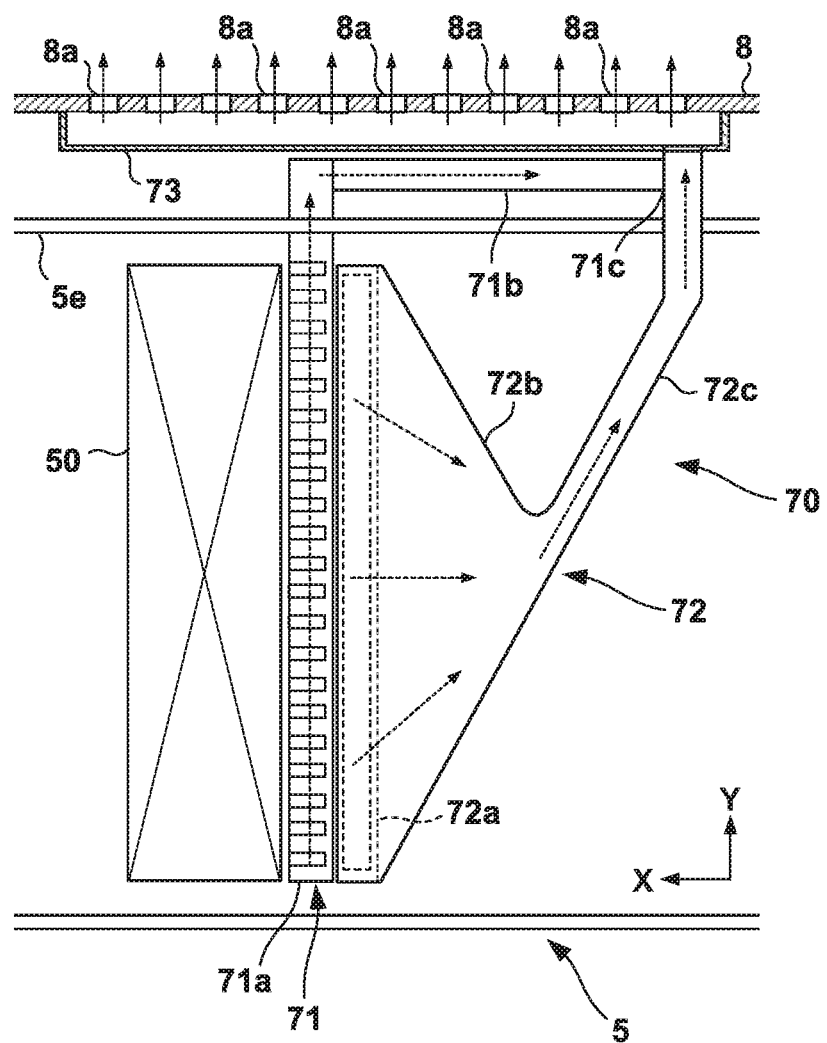
FIG. 4 is an explanatory view of an exhaust unit.

The exhaust unit 70 according to this embodiment has a structure that naturally exhausts the air in the space SP2 by a plurality of exhaust ducts 71 to 73. However, the exhaust unit 70 may forcibly exhaust the air in the apparatus by a fan or the like. The structure of the exhaust unit 70 will be described with reference to FIGS. 2 to 4. FIG. 4 is a plan view showing the periphery of the exhaust unit 70, and does not illustrate the upper wall portion 5b.

The exhaust duct 71 is a tube member including an extended portion 71a extended in the Y direction and an extended portion 71b extended from the far end portion in the Y direction of the extended portion 71a to the right side in the X direction. The extended portion 71a is extended at a position lower than the main path RT2 near a sheet discharge position in the second drying acceleration unit 50. The extended portion 71a is an air intake portion in which a plurality of slits serving as air intake ports are formed in the upper left portion and the bottom portion. For example, air warmed by the second drying acceleration unit 50 can be introduced from the slit in the upper left portion, and warm air blown from the blowing holes N of the first drying acceleration unit 40 can be introduced from the slit in the bottom portion. The extended portion 71a is extended across the back wall portion 5e, and the far end portions in the Y direction of the extended portion 71a and the extended portion 71b are located outside (on the far side in the Y direction of) the space SP2. Note that the extended portion 71a may be extended at a position above the main path RT2.

The exhaust duct 72 is a tube member including an extended portion 72a extended in the Y direction, a collecting portion 72b extending rightward from the extended portion 72a, and an extended portion 72c extended from the right end portion of the collecting portion 72b to the far side in the Y direction. The extended portion 72a is extended at a position above the main path RT2 near the sheet discharge position in the second drying acceleration unit 50. The bottom portion of the extended portion 72a is open to form an air intake port from which, for example, air warmed by the second drying acceleration unit 50 or water vapor in the space SP2 is introduced. The extended portion 72a protrudes above the upper wall portion 5b across the upper wall portion 5b.

The collecting portion 72b has, in a planar view, a triangular shape which is wide on the side of the extended portion 72a, and the overall collecting portion 72b is located above the upper wall portion 5b. The collecting portion 72b collects, to the central portion in the Y direction in the right end portion, the air introduced into the extended portion 72a. The collected air flows into the extended portion 72c. The overall extended portion 72c is also located above the upper wall portion 5b, and the extended portion 72c is partially bent and extended on the far side of the back wall portion 5e. On the far side of the back wall portion 5e, the extended portion 71b of the exhaust duct 71 is connected to the extended portion 72c of the exhaust duct 72, and the internal spaces of these portions communicate with each other. The extended portion 72c is connected to the exhaust duct 73.

The exhaust duct 73 is an exhaust member that is extended in the X direction and is open to the far side in the Y direction. The opening of the exhaust duct 73 faces a cover 8 that forms the exterior of the main body apparatus 2 on the back side. In the cover 8, a number of slits (louvers) 8a are formed, and the air flowing into the exhaust duct 73 is exhausted out of the apparatus from the back side of the main body apparatus 2 through the slits 8a.

Control Unit

Figure 5:
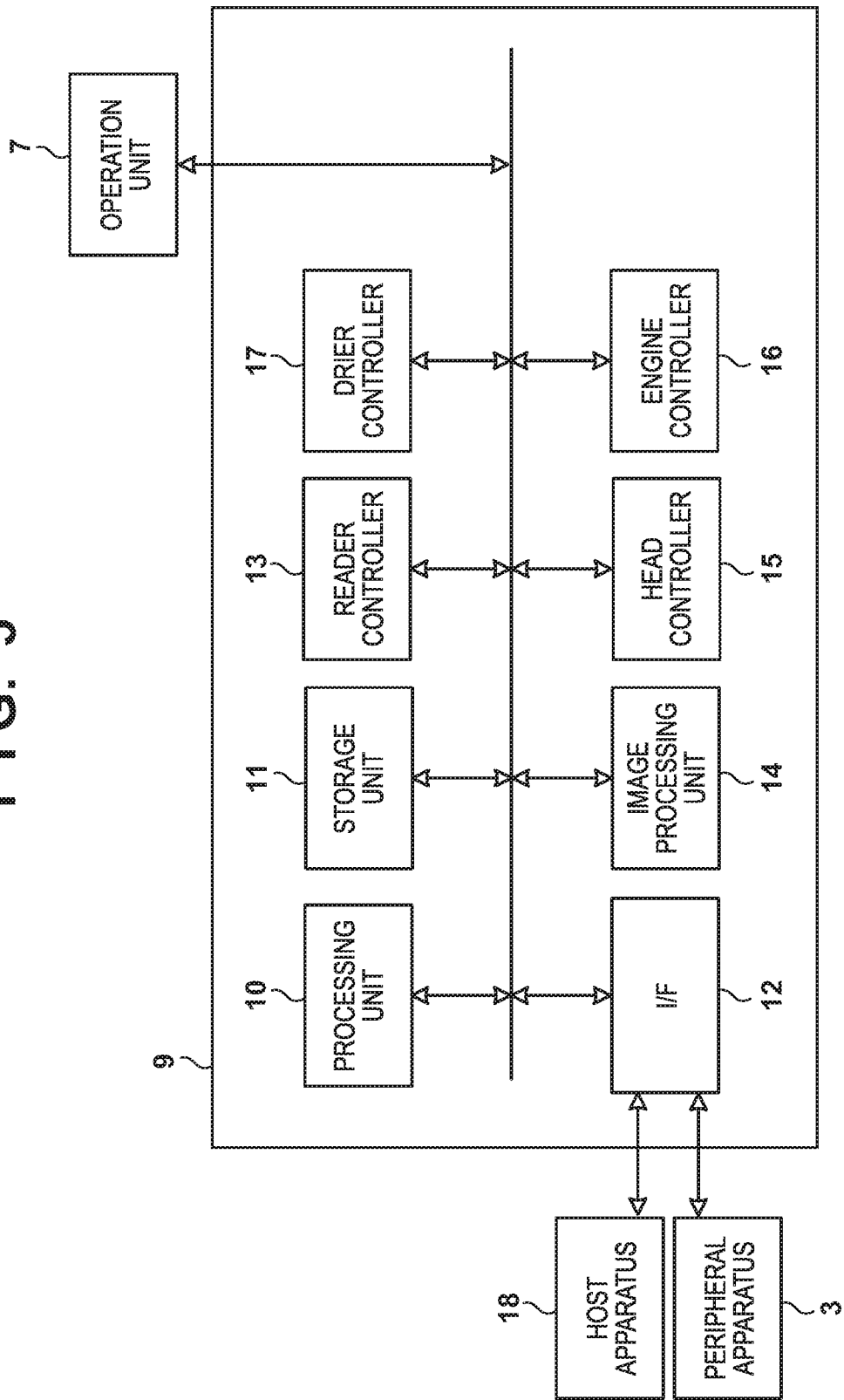
FIG. 5 is a block diagram of a control unit of a main body apparatus.

The control system of the main body apparatus 2 will be described. FIG. 5 is a block diagram of a control unit 9 of the main body apparatus 2. The control unit 9 includes a processing unit 10, a storage unit 11, a reading controller 13, an image processing unit 14, a head controller 15, an engine controller 16, and a drying controller 17. The processing unit 10 is a processor represented by a CPU (Central Processing Unit), and comprehensively controls the operations of the units of the main body apparatus 2. The storage unit 11 is, for example, a storage device such as a ROM or a RAM. The storage unit 11 stores a program to be executed by the processing unit 10, and permanent data (for example, data concerning a sheet type stored in each cassette 6a) necessary for various operations of the main body apparatus 2. The storage unit 11 serves as a work area of the processing unit 10 or a temporary storage area of various reception data to store various setting data.

The reading controller 13 controls the reading apparatus 4. The image processing unit 14 performs image processing of image data to be processed by the main body apparatus 2. The color space (for example, YCbCr) of input image data is converted into a standard RGB color space (for example, sRGB). Print data obtained by these image processes is stored in the storage unit 11. The head controller 15 controls driving of the printing unit 30 in accordance with the print data based on a control command received from the processing unit 10. The engine controller 16 controls conveyance of a sheet. The drying controller 17 controls driving of the first drying acceleration unit 40 and the second drying acceleration unit 50. Each of these controllers includes a processor such as a CPU, a storage device such as a RAM or a ROM, and an interface with an external device.

An I/O 12 is an interface (I/F) for connecting the control unit 9 to a host apparatus 18 and the post processing apparatus 3, and is a local I/F or a network I/F. The host apparatus 18 is an apparatus serving as a supply source of image data for causing the printing apparatus 5 to perform a printing operation. The host apparatus 18 may be a general-purpose or dedicated computer, or a dedicated image apparatus including an image reader, such as image capture, a digital camera, or a photo storage.

OPERATION EXAMPLE

An example of the printing operation of the printing apparatus 5 under the control of the control unit 9 will be described with reference to FIGS. 6 to 9. First, an operation when printing an image on one surface of a sheet will be described with reference to FIGS. 6 and 7. When printing an image on one surface of a sheet, the path switching units 25 and 26 are set at the positions (the positions indicated by solid lines in FIG. 3) for one-sided print. The heating elements 43 of the first drying acceleration unit 40 and the heating element 54 of the second drying acceleration unit 50 are maintained in advance at a predetermined temperature.

Figure 6:
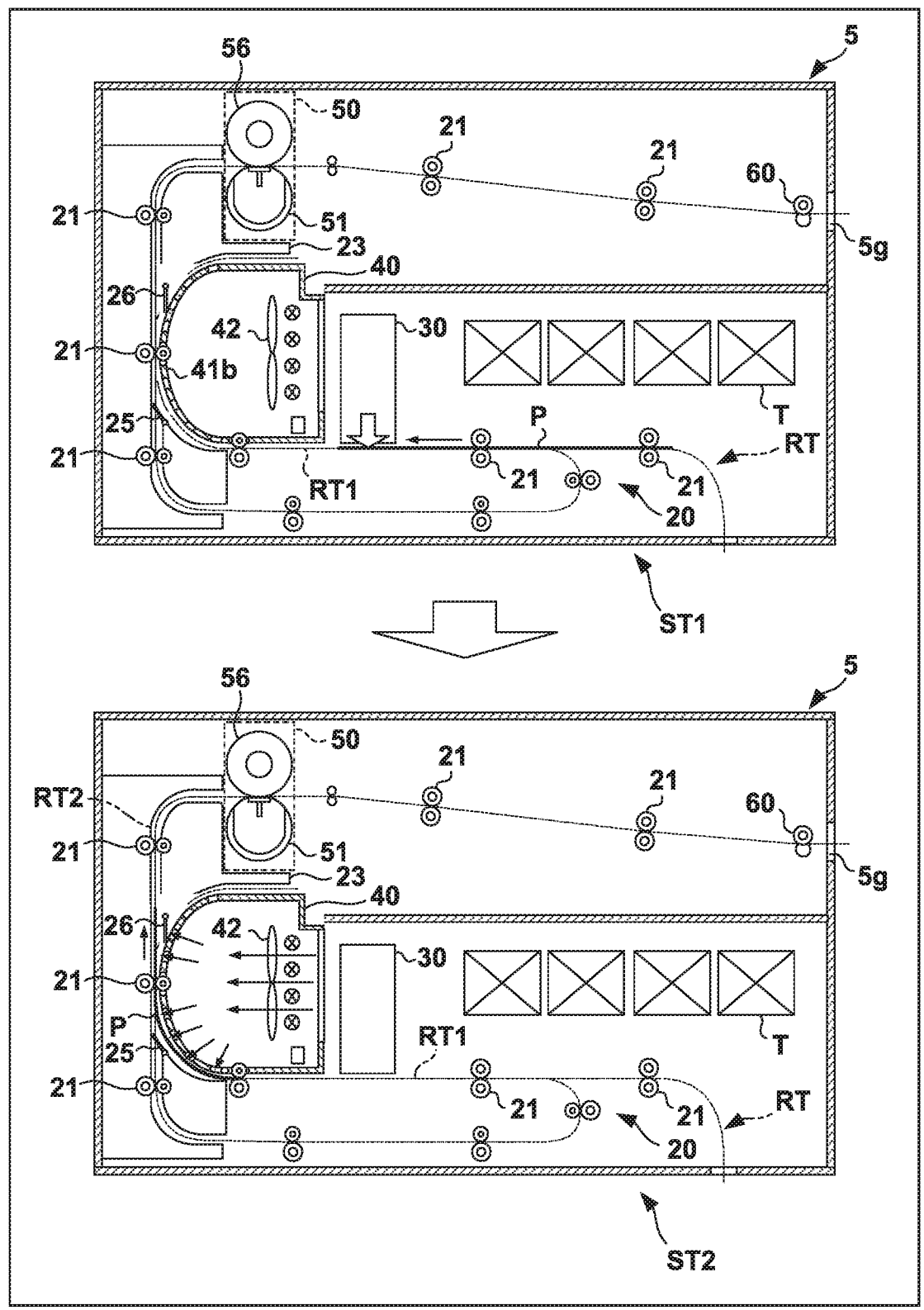
FIG. 6 is an explanatory view of the operation of the printing apparatus shown in FIG. 2.

A state ST1 shown in FIG. 6 indicates a state in which a sheet P fed from the feeding apparatus 6 has been conveyed by the conveyance unit 20 to the printing unit 30 on the main path RT1, and printing by the printing unit 30 has started. The printing unit 30 prints an image by discharging ink to the sheet P as indicated by an arrow. The sheet P is conveyed toward the first drying acceleration unit 40. The first drying acceleration unit 40 starts to operate, and blows warm air to the conveyed sheet P, as indicated by a state ST2 shown in FIG. 6. The warm air accelerates drying of the sheet P wet with ink.

The sheet P is further conveyed toward the second drying acceleration unit 50 on the main path RT2. The second drying acceleration unit 50 starts to operate, the roller 56 rotates, as indicated by a state ST3 shown in FIG. 7, and the sheet P is heated by the heater 51 while being conveyed. Drying of the sheet P is further accelerated.

Figure 7:
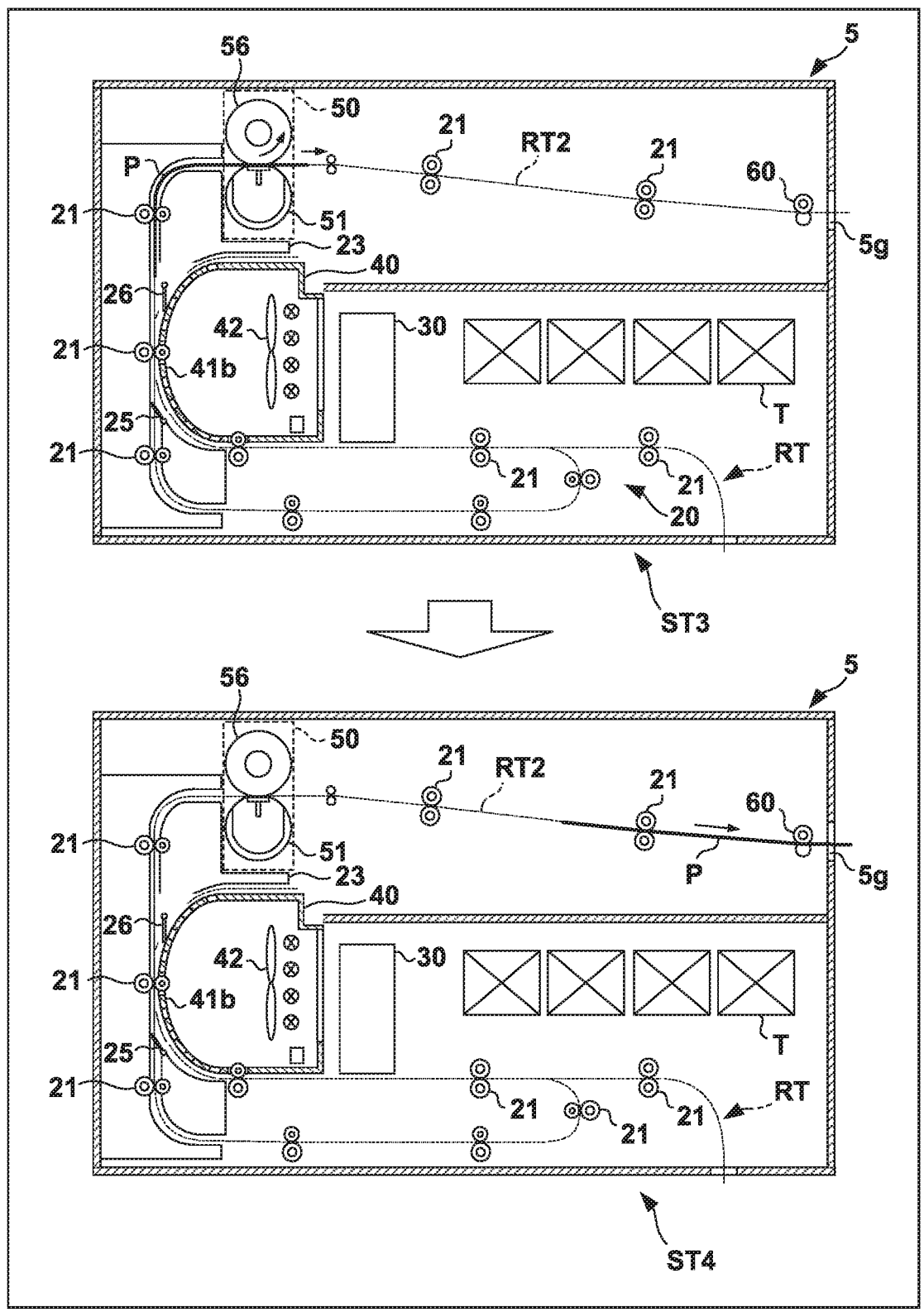
FIG. 7 is an explanatory view of the operation of the printing apparatus shown in FIG. 2.

As indicated by a state ST4 shown in FIG. 7, the sheet P is further conveyed toward the correction unit 60 on the main path RT2. The correction unit 60 starts to operate, and the sheet P is discharged from the opening 5g to the post processing apparatus 3 while the curl of the sheet P is corrected.

An operation when printing images on both surfaces of a sheet will be described next with reference to FIGS. 8 and 9. A state ST11 shown in FIG. 8 indicates a state in which the sheet P fed from the feeding apparatus 6 has been conveyed by the conveyance unit 20 to the printing unit 30 on the main path RT1, and the printing unit 30 has started printing. The printing unit 30 prints an image by discharging ink to the front surface of the sheet P, as indicated by an arrow. The path switching unit 26 is set at the position (the position indicated by the broken line in FIG. 3) for double-sided print.

The sheet P is conveyed toward the first drying acceleration unit 40. The first drying acceleration unit 40 starts to operate, and blows warm air to the conveyed sheet P, as indicated by a state ST12 shown in FIG. 8. The warm air accelerates drying of the sheet P wet with ink. The path switching unit 26 guides the sheet P not to be conveyed to the second drying acceleration unit 50 but to be conveyed to the switch-back path RT3. When the trailing edge of the sheet P passes through the position of the path switching unit 25, the path switching unit 25 is set at the position for double-sided print. Subsequently, the conveyance unit 20 conveys the sheet P in a reverse direction on the switch-back path RT3 (switch-back conveyance).

Figure 9:
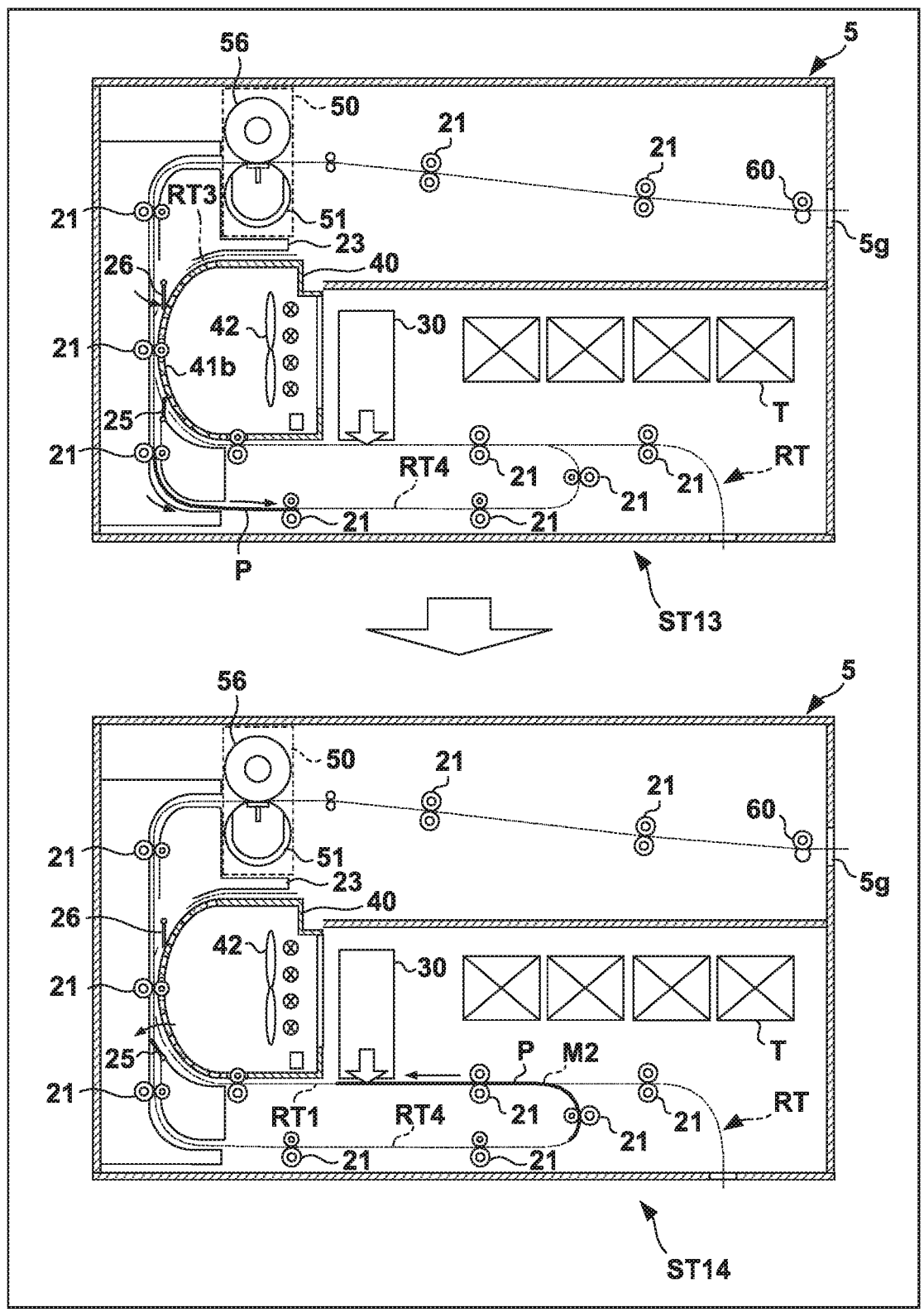
FIG. 9 is an explanatory view of the operation of the printing apparatus shown in FIG. 2.

The path switching unit 25 guides the sheet P to be conveyed to the inverting path RT4, as indicated by a state ST13 shown in FIG. 9. Then, the sheet P is returned to the main path RT1, as indicated by a state ST14 shown in FIG. 9. The path switching unit 25 is set at the position (the position indicated by the solid line in FIG. 3) for one-sided print. The printing unit 30 prints an image by discharging ink to the back surface of the sheet P, as indicated by an arrow. Operations after that are the same as those in the states ST2 to ST4 for one-sided print.

Some embodiments of power control in the printing system with the above arrangement will be described next.

First Embodiment

Figure 10:
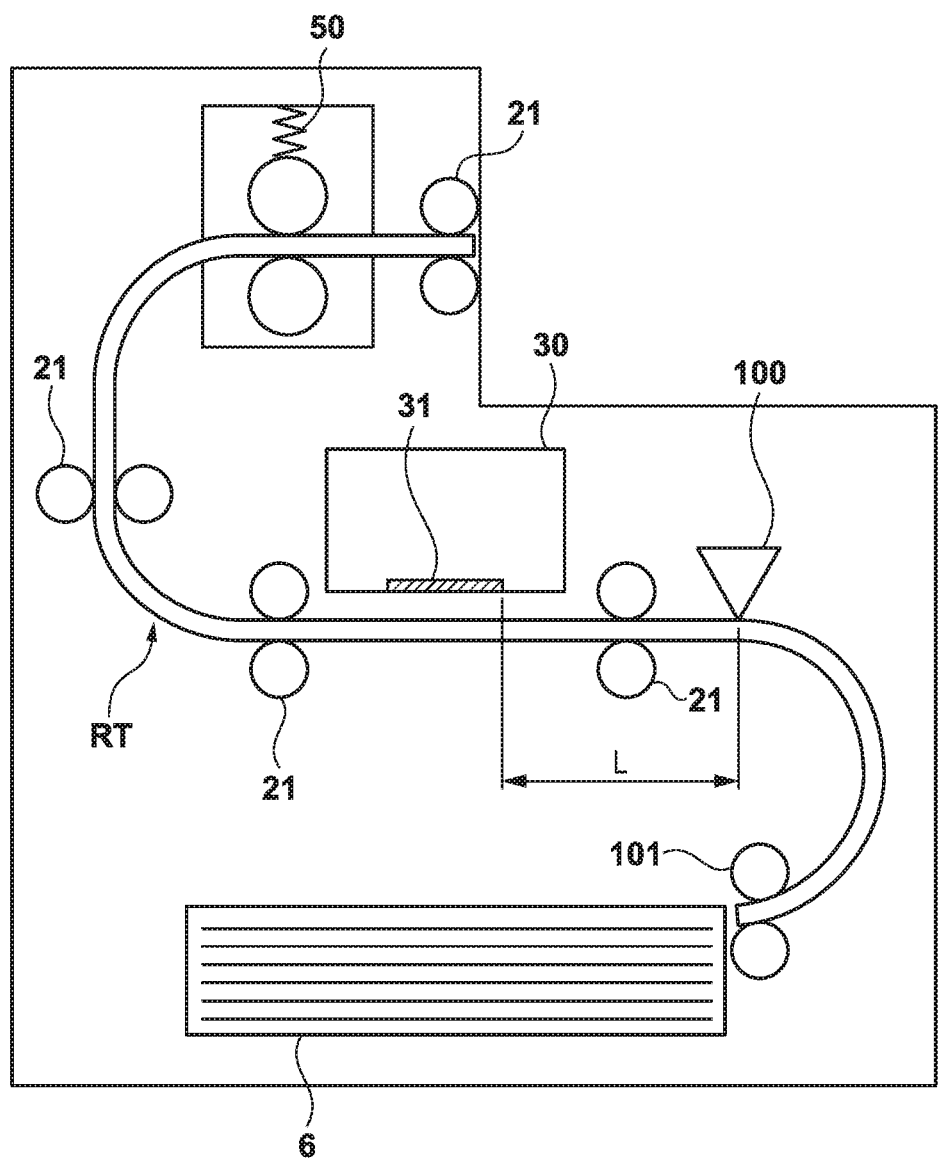
FIG. 10 is a schematic side sectional view obtained by extracting only characteristic components according to the first embodiment from the printing system shown in FIGS. 1 to 9.

FIG. 10 is a schematic side sectional view obtained by extracting only characteristic components according to this example from the printing system with the above arrangement.

As shown in FIG. 10, in this example, pickup rollers 101 that pick up sheet-like print media from the feeding apparatus 6 one by one and a medium detection sensor 100 are provided on the upstream side of the printing unit 30 with respect to the conveyance direction of the print medium on the conveyance path RT. As is apparent from FIG. 10, the medium detection sensor 100 is provided at a position away from the upstream-side position of the printheads 31 by a distance L with respect to the conveyance direction of the print medium along the conveyance path RT.

Therefore, based on a timing (t) of detecting the leading edge of the print medium by the medium detection sensor 100, the distance L, and the conveyance speed (v) of the print medium, it is possible to estimate a timing at which the leading edge of the print medium reaches the upstream-side position of the printheads 31.

Note that the remaining components in FIG. 10 are the same as those described with reference to FIGS. 1 to 9 and are thus denoted by the same reference numerals, and a description thereof will be omitted.

In this example, the power consumption of the overall printing system 1 is suppressed by exclusively controlling discharge by the full-line heads (printheads 31) and heating of the thermal fixing unit (second drying acceleration unit 50). More specifically, when printing on a plurality of print media by continuously feeding the print media, the following control operation is executed. That is, when the print medium (a printing area thereof) exists at a position facing the nozzles of the printheads 31, heating (energization) of the thermal fixing unit is turned off. To the contrary, when no print medium exists at a position facing the nozzles of the printheads 31, heating (energization) of the thermal fixing unit is turned on (for example, between the currently conveyed print medium and the next print medium).

Power control of the printing system according to this example will be described with reference to characteristics according to the first embodiment in FIGS. 11 and 12A to 12C.

Figure 11:
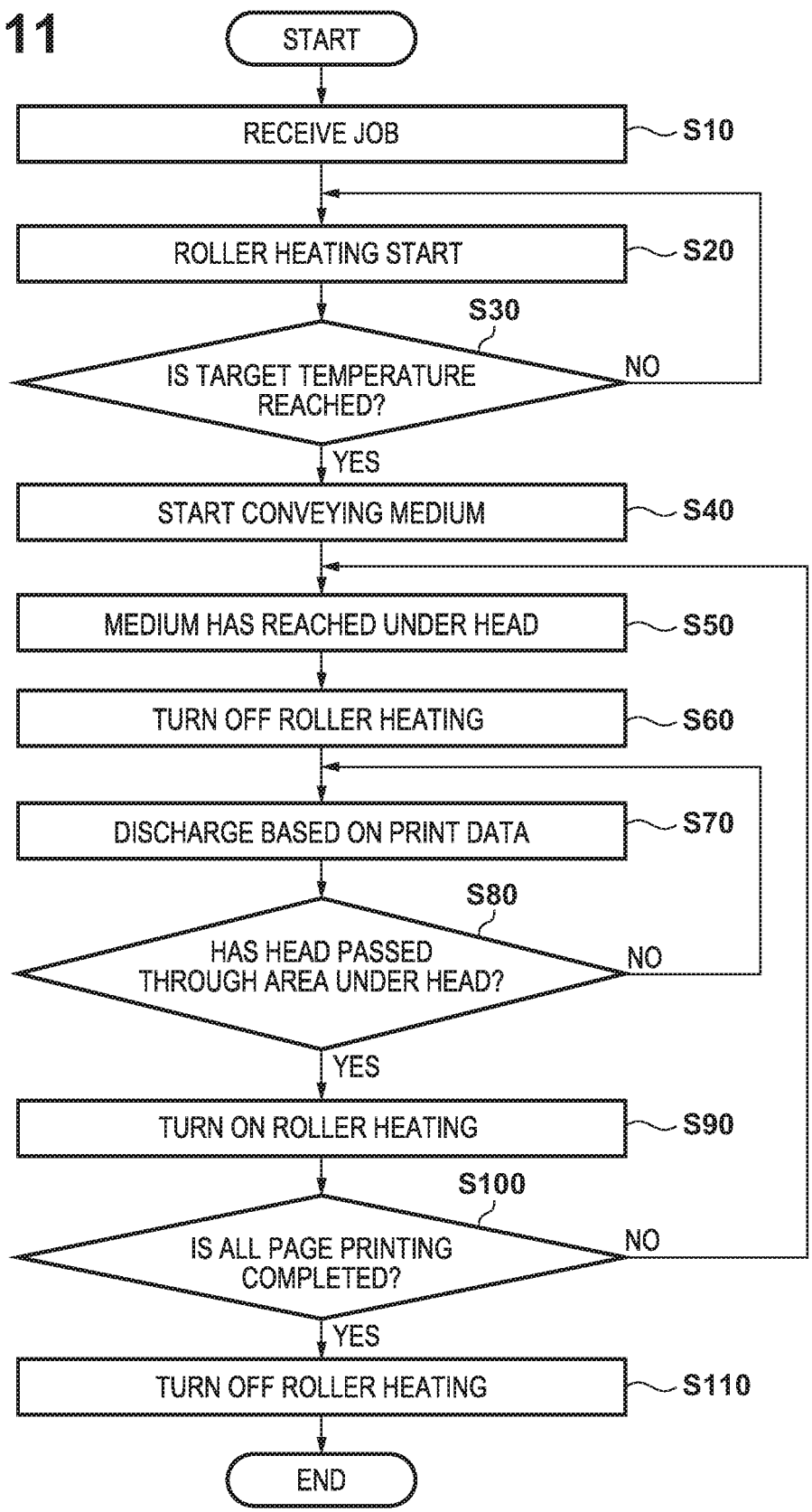
FIG. 11 is a flowchart illustrating power control processing of the printing system according to the first embodiment.

FIG. 11 is a flowchart illustrating power control processing of the printing system according to the first embodiment. This flowchart assumes that printing on a plurality of print media is instructed as a print job and the plurality of print media are continuously fed from the feeding apparatus 6 to the printing unit 30.

Figure 12C:
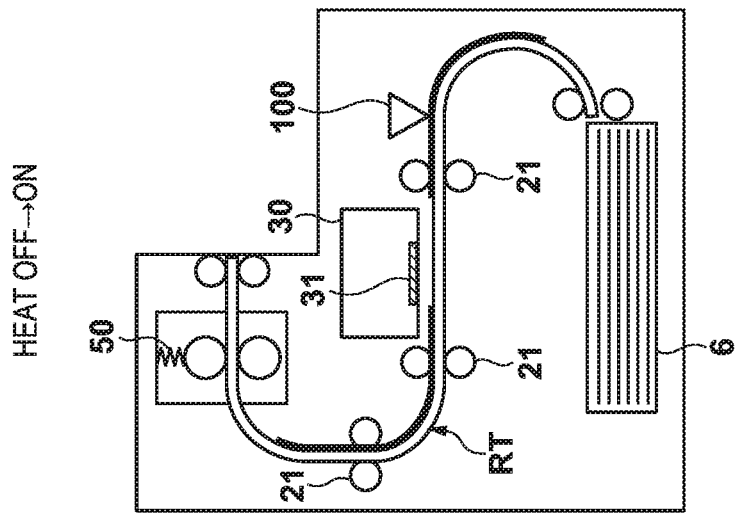
FIGS. 12A, 12B, and 12C are views each showing the relationship between ON/OFF of heating of a thermal fixing unit and the positional relationship between print media and a printhead.
Figure 12B:
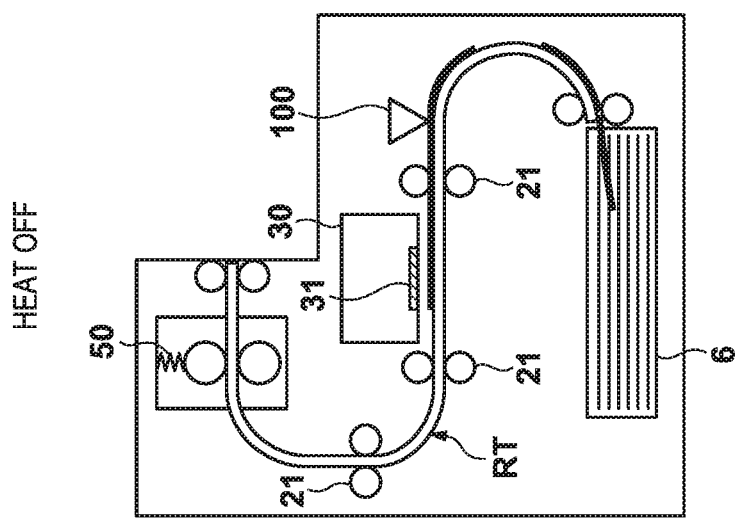
Figure 12A:
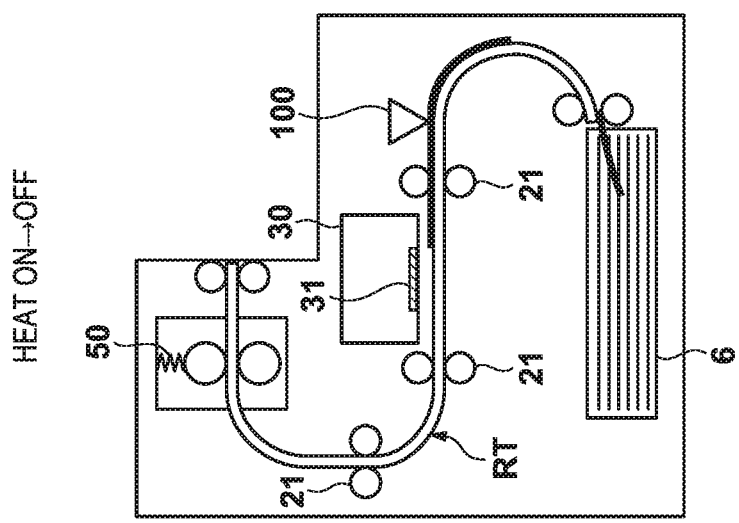

FIGS. 12A to 12C are views each showing the relationship between ON/OFF of heating of the thermal fixing unit and the positional relationship between the continuously fed print media and the printheads.

If a print job (Job) is received from the host apparatus in step S10, in step S20 the heater 51 of the second drying acceleration unit 50 is energized to start heating of the roller 56 that is paired with the heater 51 to form a nip portion and nips the print medium. Since this arrangement sets the heater 51 and the roller 56 in a thermal quasi-equilibrium state, the temperature of the heater 51 is detected and this detected temperature can be considered as the temperature of the roller 56.

In step S30, it is checked whether the temperature (T) of the heater 51 detected by the temperature sensor 55 has reached a target temperature (T0). Heating is continued until the target temperature is reached. If it is determined that the temperature of the heater 51 has reached the target temperature, the process advances to step S40.

Note that the temperature (T) of the heater 51 may be detected by, for example, an additionally provided infrared sensor (not shown), instead of the temperature sensor 55. The infrared sensor may detect the temperature of the roller 56 instead of the temperature (T) of the heater 51. In this case, the temperature of the roller 56 is directly detected.

In step S40, the pickup rollers 101 of the feeding apparatus 6 are driven to pick up the print medium (medium), thereby feeding the print medium to the conveyance path RT. In step S50, it is confirmed by using the medium detection sensor 100 whether the leading edge of the fed print medium has reached a print position facing the printheads 31. If it is determined that the leading edge of the print medium has reached the print position facing the printheads 31, the process turns off energization of the heater 51 in step S60, thereby stopping heating of the roller 56.

More specifically, if, as shown in FIG. 12A, the print medium is fed by the feeding apparatus 6 and it is confirmed by using the medium detection sensor 100 that the fed print medium has reached the position immediately below the printheads 31, heating of the heater 51 by the second drying acceleration unit 50 is changed from the ON state to the OFF state.

In step S70, the print elements (heaters) of the printheads 31 are energized based on the print data transmitted from the host apparatus and ink is discharged to the print medium conveyed to the print position facing the printheads 31, thereby executing printing. At this time, in step S80, the print medium is conveyed along with progress of printing, and it is checked whether the trailing edge of the print medium has passed through the print position facing the printheads 31. Printing based on the print data is continued in step S70 until it is confirmed that the trailing edge of the print medium has passed through the print position facing the printheads 31. If it is confirmed that the trailing edge of the print medium has passed through the print position facing the printheads 31, the process advances to step S90.

As described above, since each printhead 31 is a full-line head having a print width corresponding to the width of the print medium, conveyance of the print medium never stops for printing. In addition, since the print medium fed from the feeding apparatus 6 is a standard-sized sheet-like print medium, the length of the print medium in the conveyance direction is also decided when the user designates the size (for example, an A4, A4R, or B4 size) of the print medium. Therefore, if the timing of detecting the leading edge of the print medium is known by the medium detection sensor, it is possible to estimate, based on the conveyance speed of the print medium, the length of the print medium in the conveyance direction, and the distance between the printheads and the medium detection sensor, a timing at which the trailing edge of the print medium passes through the print position facing the printheads.

As shown in FIG. 12B, while the print medium passes through the print position facing the printheads 31, heating of the heater 51 by the second drying acceleration unit 50 is maintained in the OFF state. To the contrary, as shown in FIG. 12C, if the trailing edge of the print medium has passed through the print position facing the printheads 31, it takes time for the leading edge of the following print medium to reach the print position facing the printheads 31. Therefore, heating of the heater 51 by the second drying acceleration unit 50 transitions from the OFF state to the ON state.

During a period until the leading edge of the following print medium reaches the position facing the printheads 31, the print elements (heaters) of the printheads 31 are not energized, and thus the instantaneous power consumption of the printing system decreases. Therefore, during this period, the power capacity of the printing system has a margin. Therefore, in step S90, the heater 51 of the second drying acceleration unit 50 is energized to restart heating of the roller 56 that is paired with the heater 51 to form the nip portion and nips the print medium.

Furthermore, in step S100, it is checked whether printing for all pages based on the received print job has ended. If it is determined that printing has not ended, the process returns to step S50, and printing is continued for the following print medium; otherwise, the process advances to step S110, and heating of the roller 56 is stopped, thereby ending the processing.

Therefore, according to the above-described embodiment, if the print medium is at the position facing the printheads and the printheads are driven, control is executed to turn off heating of the heater. Furthermore, if the print medium is not at the position facing the printheads and the printheads are not driven, control is executed to turn on heating of the heater. Thus, the timing of heating of the heater and the timing of driving of the printheads are exclusive, and power consumption by the heater and that by the printheads do not occur concurrently, thereby preventing the power consumption from becoming high instantaneously.

Second Embodiment

The first embodiment has explained the example of controlling heating of the roller based on the positional relationship between the print medium and the printheads. This example will describe an example of controlling heating of the roller in consideration of a printing duty.

Figure 13:
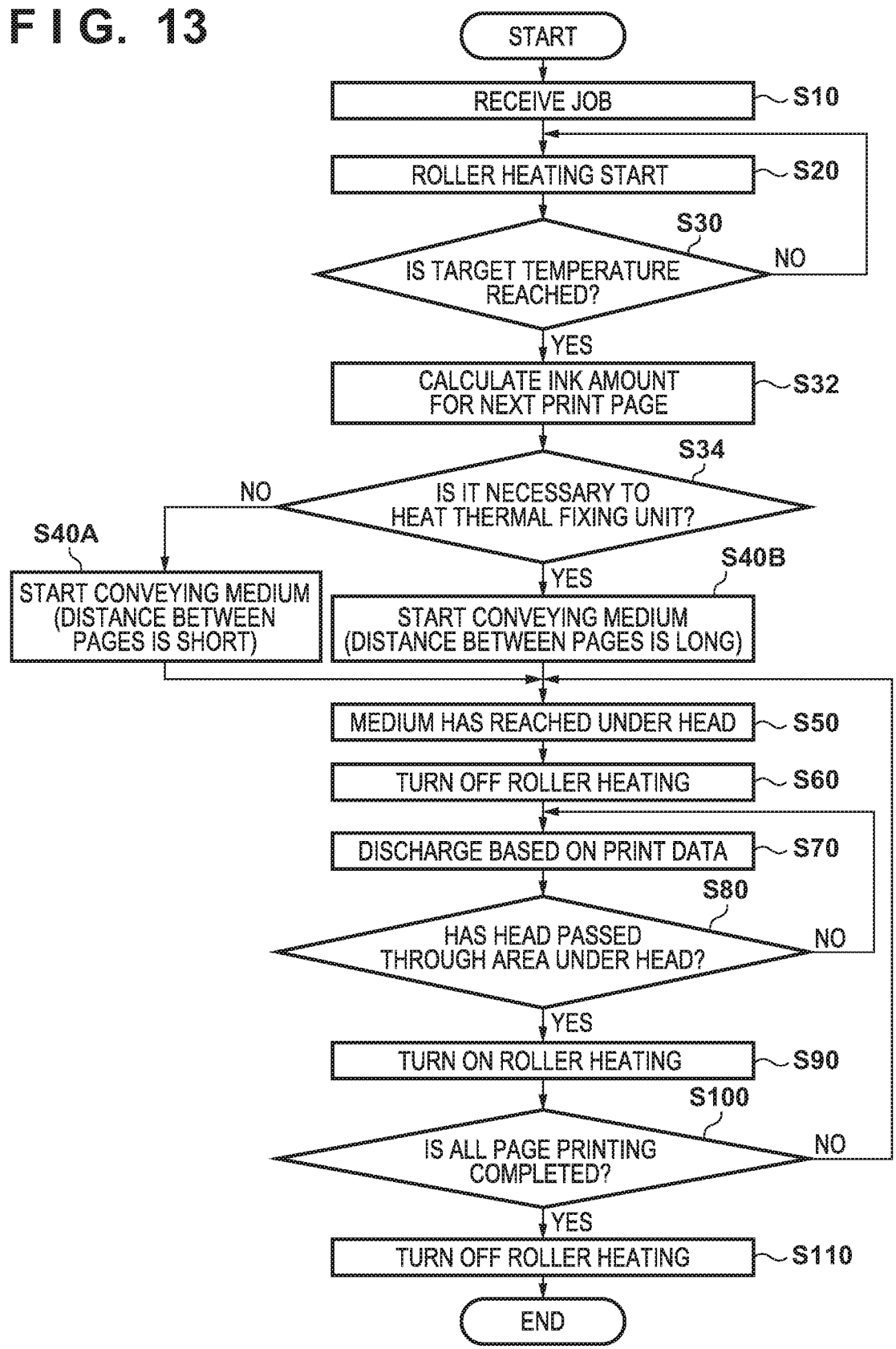
FIG. 13 is a flowchart illustrating power control processing of the printing system according to the second embodiment.

FIG. 13 is a flowchart illustrating power control processing of the printing system according to the second embodiment. Note that in FIG. 13, the same step numbers as those in FIG. 11 of the first embodiment denote the same processing steps and a description thereof will be omitted. This flowchart assumes that printing on a plurality of print media is instructed as a print job and the plurality of print media are continuously fed from the feeding apparatus 6 to the printing unit 30, similar to the first embodiment.

Figure 14B:
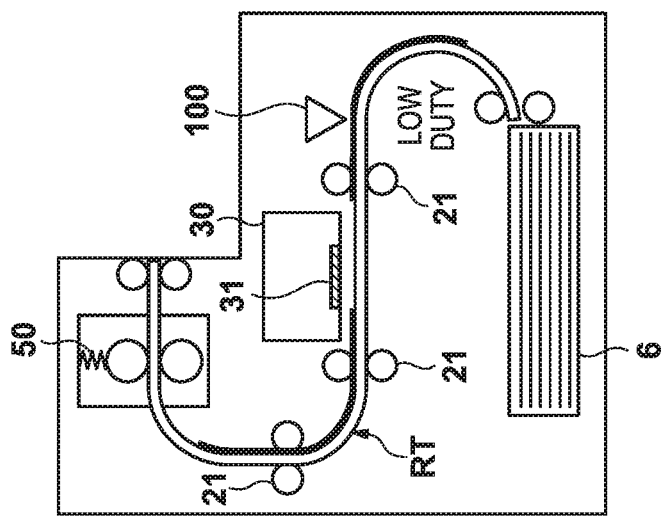
FIGS. 14A and 14B are views each showing the relationship between ON/OFF of heating of the thermal fixing unit and the distance between continuously fed print media.
Figure 14A:
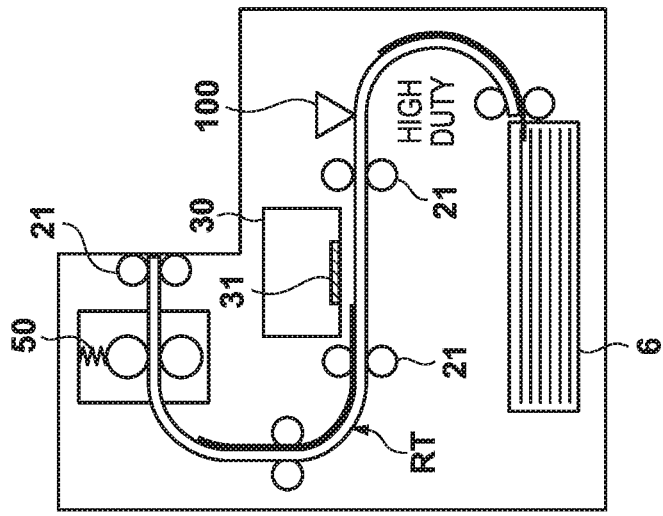

FIGS. 14A and 14B are views each showing the relationship between ON/OFF of heating of the thermal fixing unit and the distance between continuously fed print media.

If, similar to the first embodiment, processes in steps S10 to S30 are executed and it is determined that the temperature (T) of the heater 51 has reached the target temperature (T0), the process calculates, in step S32, an amount of ink discharged by the printheads 31 based on print data used to print the next page. In step S34, it is checked based on the calculated amount of ink whether heating of the heater 51 by the second drying acceleration unit 50 is necessary.

If the amount of ink discharged to one print medium is small, that is, the printing duty is low, not a large amount of heat is required to evaporate a liquid component of the discharged ink, and heating of the heater 51 is thus unnecessary. On the other hand, if the amount of ink discharged to one print medium is large, that is, the printing duty is high, a large amount of heat is required to evaporate a liquid component of the discharged ink, and thus it is necessary to heat the heater 51 to perform thermal fixing.

If the printing duty is low and it is determined that heating of the heater 51 is not required, time taken to heat the heater 51 is not required. Therefore, the process advances to step S40A, and a timing of picking up the next print medium and feeding it is set to be earlier to shorten the distance between the print media, as shown in FIG. 14A. On the other hand, if the printing duty is high and it is determined that heating of the heater 51 is required, it takes certain time to heat the heater 51. Therefore, the process advances to step S40B, and a timing of picking up the next print medium and feeding it is set to be later to increase the distance between the print media, as shown in FIG. 14B.

Processes in step S50 and subsequent steps after the print medium is fed to reach the position facing the printheads 31 are the same as those described in the first embodiment.

Therefore, according to the above-described embodiment, when executing printing with a low duty, printing is executed by shortening the interval between the continuously fed print media by stopping heating of the heater. When executing printing with a high duty, it is possible to increase the interval between the continuously fed print media for heating the heater. As described above, by controlling heating of the heater or adjusting the interval between the continuously fed print media based on the printing duty, it is possible to increase the print speed and reduce the power consumption in accordance with the printing duty.

Third Embodiment

The first embodiment has explained the example of controlling heating of the roller based on the positional relationship between the print medium and the printheads, and the second embodiment has explained the example of controlling heating of the roller based on the printing duty. This example will describe an example of controlling heating of the roller based on the printing duty and the temperature of the heater.

Especially, in this embodiment, if the OFF state of heating of the heater continues, the temperature of the roller decreases. Thus, if the printing duty is high and heating of the heater is required, it is checked whether the temperature of the roller is equal to or higher than the target temperature, and heating of the roller is controlled in accordance with a result.

Figure 15:
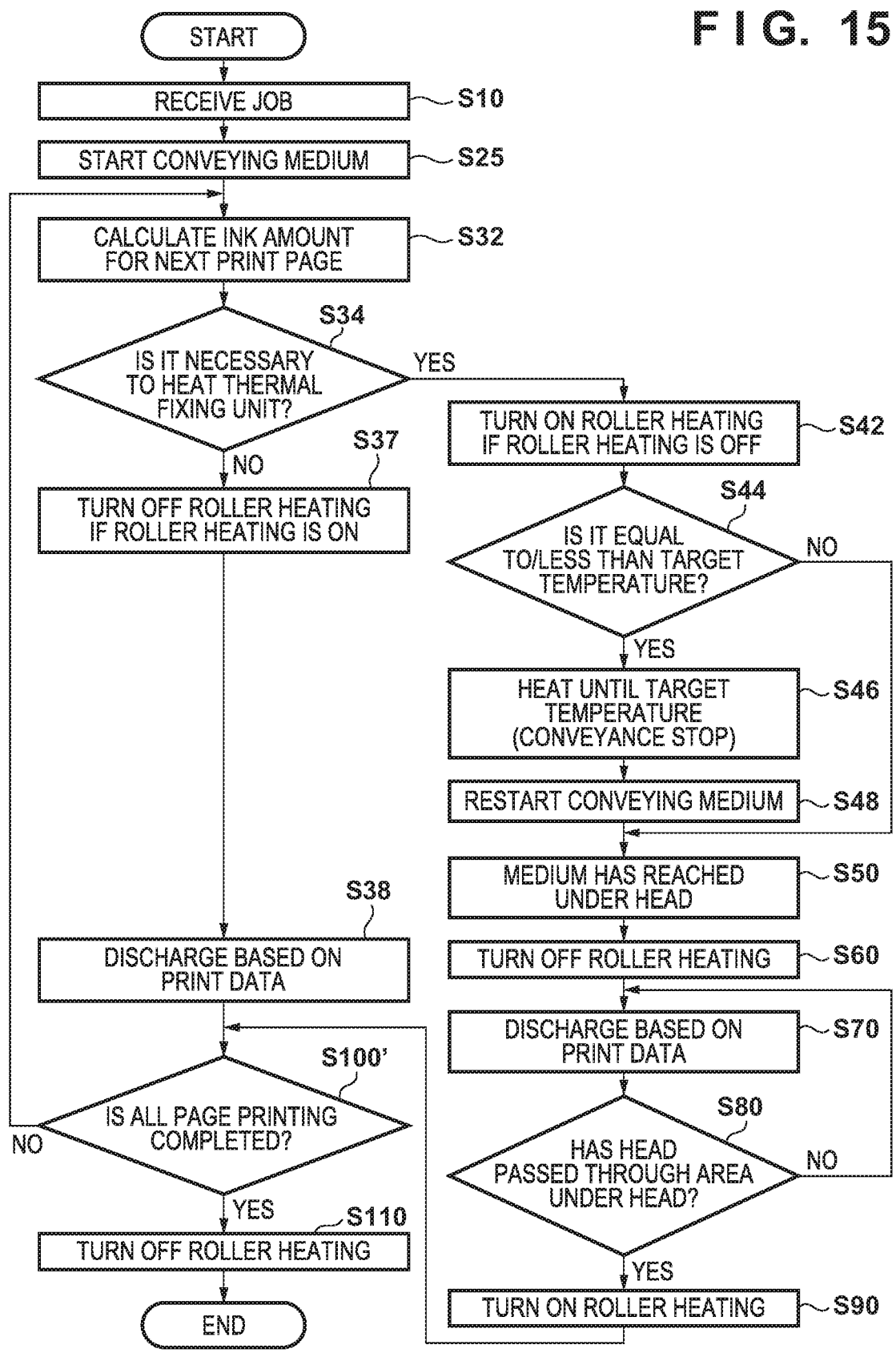
FIG. 15 is a flowchart illustrating power control processing of the printing system according to the third embodiment.

FIG. 15 is a flowchart illustrating power control processing of the printing system according to the third embodiment. Note that in FIG. 15, the same step numbers as those in FIG. 11 of the first embodiment and FIG. 13 of the second embodiment denote the same processing steps and a description thereof will be omitted. This flowchart assumes that printing on a plurality of print media is instructed as a print job and the plurality of print media are continuously fed from the feeding apparatus 6 to the printing unit 30, similar to Embodiments 1 and 2.

Figure 16B:
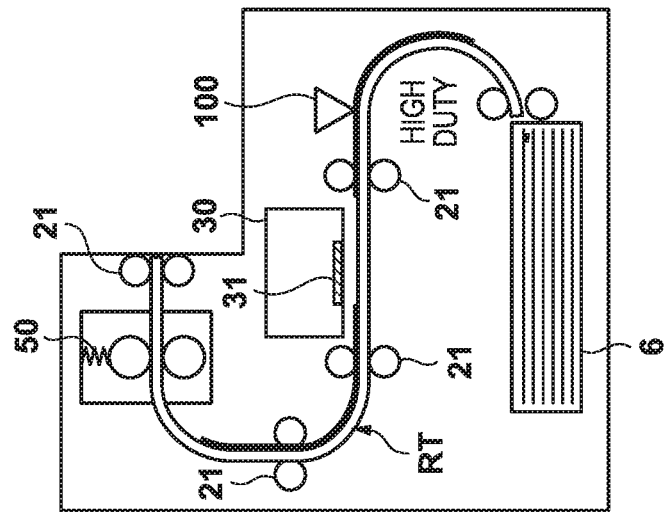
FIGS. 16A and 16B are views each showing the relationship between a printing duty and ON/OFF of heating of the thermal fixing unit.
Figure 16A:
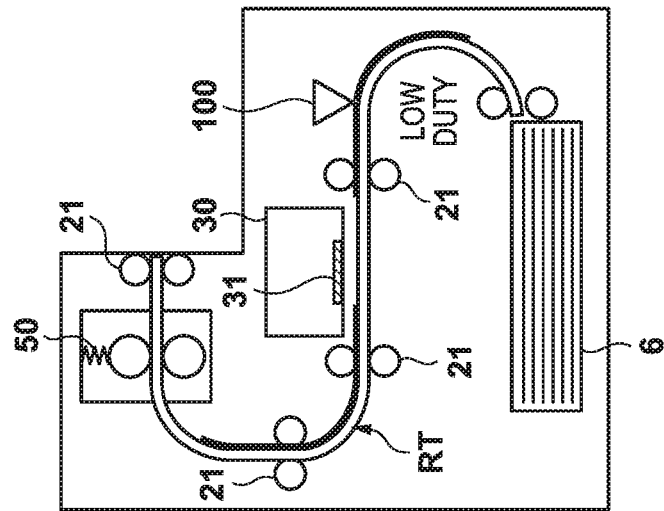

FIGS. 16A and 16B are views each showing the relationship between the printing duty and ON/OFF of heating of the thermal fixing unit.

When receiving a print job in step S10, the pickup rollers 101 of the feeding apparatus 6 are driven in step S25 to pick up the print medium (medium), thereby starting to feed/convey the print medium to the conveyance path RT. After that, as described in the second embodiment, processes in steps S32 to S34 are executed, and it is checked based on a calculated amount of ink whether heating of the heater 51 by the second drying acceleration unit 50 is required.

If the amount of ink discharged to one print medium is small, that is, the printing duty is low, it is determined that heating of the heater 51 is not required, the process advances to step S37, and energization of the heater 51 is turned off to stop heating of the roller 56, as shown in FIG. 16A. Furthermore, in step S38, the print elements (heaters) of the printheads 31 are energized based on print data transmitted from the host apparatus, and ink is discharged to the print medium conveyed immediately below the printheads 31, thereby executing printing. In step S100', it is checked whether printing for all pages based on the received print job has ended. If it is determined that printing has not ended, the process returns to step S32, and printing is continued for the following print medium; otherwise, the process advances to step S110, and heating of the roller 56 is stopped, thereby ending the processing.

On the other hand, if the ink amount discharged to one print medium is large, that is, the printing duty is high, it is determined that it is necessary to heat the heater 51 to perform thermal fixing, as shown in FIG. 16B, and the process advances to step S42. In step S42, the heater 51 of the second drying acceleration unit 50 is energized to heat the roller 56 that is paired with the heater 51 to form the nip portion and nips the print medium.

Next, in step S44, it is checked whether the temperature (T) of the heater 51 detected by the temperature sensor 55 has reached the target temperature (T0). If the temperature (T) of the heater is equal to or lower than the target temperature (T0) (T≤T0), the process advances to step S46, and conveyance of the print medium is temporarily stopped and heating is continued until the temperature of the heater 51 reaches the target temperature. Then, if it is determined that the temperature of the heater 51 has reached the target temperature, the process advances to step S48, and conveyance of the print medium is restarted. After that, the process advances to step S50.

Note that the temperature (T) of the heater 51 may be detected by, for example, an additionally provided infrared sensor (not shown), instead of the temperature sensor 55. The infrared sensor may detect the temperature of the roller 56 instead of the temperature (T) of the heater 51.

On the other hand, if the temperature (T) of the heater exceeds the target temperature (T0) (T>T0), the process advances to step S50.

Similar to the first embodiment, after processes in steps S50 to S90 are executed, it is checked in step S100' whether printing for all the pages based on the received print job has ended, and the above-described processing is executed.

Therefore, according to the above-described embodiment, it is possible to control the roller and heating of the roller based on not only the positional relationship between the print medium and the printheads but also the next printing duty and the temperature of the heater.

Instead of or in addition to the above-described three embodiments, heating of the roller may be controlled in accordance with whether printing is monochrome printing or color printing. Since the printhead is provided for each kind of ink, as described above, only the printhead using black ink is driven for monochrome printing, and all the printheads are driven to use all inks for color printing. Therefore, when paying attention to the power consumption of the printheads, power consumption in monochrome printing is smaller than that in color printing. For this reason, for example, control may be executed to shorten the distance between the print media for monochrome printing and to increase the distance between the print media for color printing, similar to the second embodiment.

Instead of or in addition to the above-described three embodiments, heating of the roller may be controlled in accordance with whether printing is high-speed printing or low-speed printing. For high-speed printing, the number of print elements (heaters) to be driven is normally made small to decrease the printing resolution. For low-speed printing, the number of print elements (heaters) to be driven is normally made large to increase the printing resolution. On the other hand, since the power consumption of the printheads depends on the number of print elements to be driven, the power consumption in high-speed printing is smaller than that in low-speed printing. For this reason, for example, control may be executed to shorten the distance between the print media for high-speed printing and to increase the distance between the print media for low-speed printing, similar to the second embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-164787, filed Sep. 10, 2019, which is hereby incorporated by reference herein in its entirety.

What is claimed is:

1. A printing apparatus comprising:
   a conveyance unit configured to convey a print medium fed from a feeding apparatus;
   a detection unit configured to detect the print medium fed from the feeding apparatus;
   a printhead provided downstream of the detection unit with respect to a conveyance direction of the print medium by the conveyance unit and configured to print an image by discharging ink to the print medium conveyed by the conveyance unit;
   a heating unit provided downstream of the printhead with respect to the conveyance direction and configured to heat the print medium on which the image is printed by the printhead; and
   a control unit configured to exclusively control to stop driving of the heating unit if it is determined, based on a timing of detecting the print medium by the detection unit, that the print medium is at a print position where the print medium is printed by the printhead, and to drive the heating unit if it is determined that the print medium is not at the print position.

2. The apparatus according to claim 1, wherein
   the detection unit detects a leading edge of the print medium, and
   the control unit determines whether the print medium is at the print position, based on a timing of detecting the leading edge by the detection unit, a conveyance speed of the print medium by the conveyance unit, and a size of the print medium.

3. The apparatus according to claim 2, wherein the heating unit includes:
   a roller configured to heat the print medium by contacting the print medium;
   a heater configured to heat the roller; and
   a sensor configured to detect a temperature of the roller, and
   the control unit controls to heat the roller by driving the heater until the temperature of the roller detected by the sensor reaches a target temperature.

4. The apparatus according to claim 3, wherein the sensor is one of a sensor configured to detect the temperature of the heater and an infrared sensor configured to detect the temperature of the roller.

5. The apparatus according to claim 1, further comprising a reception unit configured to receive a print job of printing an image on each of print media continuously fed from the feeding apparatus,
   wherein the control unit controls the driving of the heating unit based on the print job received by the reception unit.

6. The apparatus according to claim 5, further comprising:
   a calculation unit configured to calculate, based on print data included in the received print job, an ink amount used by the printhead to print an image on a next print medium when printing the image on each of the continuously fed print media; and
   a determination unit configured to determine, based on the ink amount calculated by the calculation unit, whether the driving of the heating unit is required to print the image on the next print medium.

7. The apparatus according to claim 6, wherein if the determination unit determines that the driving of the heating unit is required, the control unit controls to set a timing of feeding the next print medium by the feeding apparatus to be later, and if the determination unit determines that the driving of the heating unit is not required, the control unit controls to set the timing of feeding the next print medium to be earlier.

8. The apparatus according to claim 6, wherein if the determination unit determines that the driving of the heating unit is required, the control unit controls to drive the heating unit, and if the determination unit determines that the driving of the heating unit is not required, the control unit controls to stop the driving of the heating unit.

9. The apparatus according to claim 8, wherein if the determination unit determines that the driving of the heating unit is required and the heating unit is driven, the control unit controls an operation of the conveyance unit to temporarily stop conveyance of the print medium by the conveyance unit until a temperature of the heating unit reaches a target temperature.

10. The apparatus according to claim 1, wherein the control unit further controls the driving of the heating unit in accordance with whether printing of the image on the print medium is monochrome printing or color printing.

11. The apparatus according to claim 1, wherein the control unit further controls the driving of the heating unit in accordance with whether printing of the image on the print medium is high-speed printing or low-speed printing.

12. A control method for a printing apparatus including a conveyance unit configured to convey a print medium fed from a feeding apparatus, a detection unit configured to detect the print medium fed from the feeding apparatus, a printhead provided downstream of the detection unit with respect to a conveyance direction of the print medium by the conveyance unit and configured to print an image by discharging ink to the print medium conveyed by the conveyance unit, and a heating unit provided downstream of the printhead with respect to the conveyance direction and configured to heat the print medium on which the image is printed by the printhead, the method comprising:

exclusively controlling to stop driving of the heating unit if it is determined, based on a timing of detecting the print medium by the detection unit, that the print medium is at a print position where the print medium is printed by the printhead, and to drive the heating unit if it is determined that the print medium is not at the print position.

13. The method according to claim 12, wherein
the detection unit detects a leading edge of the print medium, and
in the exclusively controlling, it is determined whether the print medium is at the print position based on a timing of detecting the leading edge by the detection unit, a conveyance speed of the print medium by the conveyance unit, and a size of the print medium.

14. The method according to claim 13, wherein if the heating unit includes a roller configured to heat the print medium by contacting the print medium, a heater configured to heat the roller, and a sensor configured to detect a temperature of the roller, in the exclusively controlling, control is executed to heat the roller by driving the heater until the temperature of the roller detected by the sensor reaches a target temperature.

15. The method according to claim 12, further comprising receiving a print job of printing an image on each of print media continuously fed from the feeding apparatus,
wherein in the exclusively controlling, the driving of the heating unit is controlled based on the received print job.

16. The method according to claim 15, further comprising:
calculating, based on print data included in the received print job, an ink amount used by the printhead to print an image on a next print medium when printing the image on each of the continuously fed print media; and
determining, based on the calculated ink amount, whether the driving of the heating unit is required to print the image on the next print medium.

17. The method according to claim 16, wherein in the exclusively controlling, if it is determined that the driving of the heating unit is required, control is executed to set a timing of feeding the next print medium by the feeding apparatus to be later, and if it is determined that the driving of the heating unit is not required, control is executed to set the timing of feeding the next print medium to be earlier.

18. The method according to claim 16, wherein in the exclusively controlling, if it is determined that the driving of the heating unit is required, control is executed to drive the heating unit, and if it is determined that the driving of the heating unit is not required, control is executed to stop the driving of the heating unit.

19. The method according to claim 18, wherein in the exclusively controlling, if it is determined that the driving of the heating unit is required and the heating unit is driven, an operation of the conveyance unit is controlled to temporarily stop conveyance of the print medium by the conveyance unit until a temperature of the heating unit reaches a target temperature.

* * * * *